W. D. GUMPP, F. M. FRANCART & G. C. DEBAY.
GLASS BLOWING APPARATUS.
APPLICATION FILED AUG. 11, 1915.

1,195,002.

Patented Aug. 15, 1916.
2 SHEETS—SHEET 2.

WITNESSES
J. R. Keller
John F. Hall

INVENTORS

UNITED STATES PATENT OFFICE.

WARREN D. GUMPP, OF ARNOLD, AND FERNAND M. FRANCART AND GEORGE C. DEBAY, OF SPRINGDALE, PENNSYLVANIA.

GLASS-BLOWING APPARATUS.

1,195,002.

Specification of Letters Patent.   Patented Aug. 15, 1916.

Application filed August 11, 1915.   Serial No. 45,011.

*To all whom it may concern:*

Be it known that we, WARREN D. GUMPP, a resident of Arnold, in the county of Westmoreland, and FERNAND M. FRANCART and GEORGE C. DEBAY, residents of Springdale, in the county of Allegheny, State of Pennsylvania, citizens of the United States, have invented a new and useful Improvement in Glass-Blowing Apparatus; and we do hereby declare the following to be a full, clear, and exact description thereof.

Our invention relates to glass blowing apparatus, and more particularly to apparatus adapted for use in formation of glass-cylinders for the manufacture of window-glass.

By our invention we made provision for raising the molten glass up in position to be engaged by the bait, whereupon the receptacle containing the glass is lowered and, at the same time, air is admitted automatically to inflate the mass of glass, which is suspended from the bait, and as the receptacle containing the molten glass continues to lower, further additions of air are admitted so as to properly provide for the expansion of the glass into the form of a cylinder, all as fully hereinafter set forth and claimed.

Figure 1:
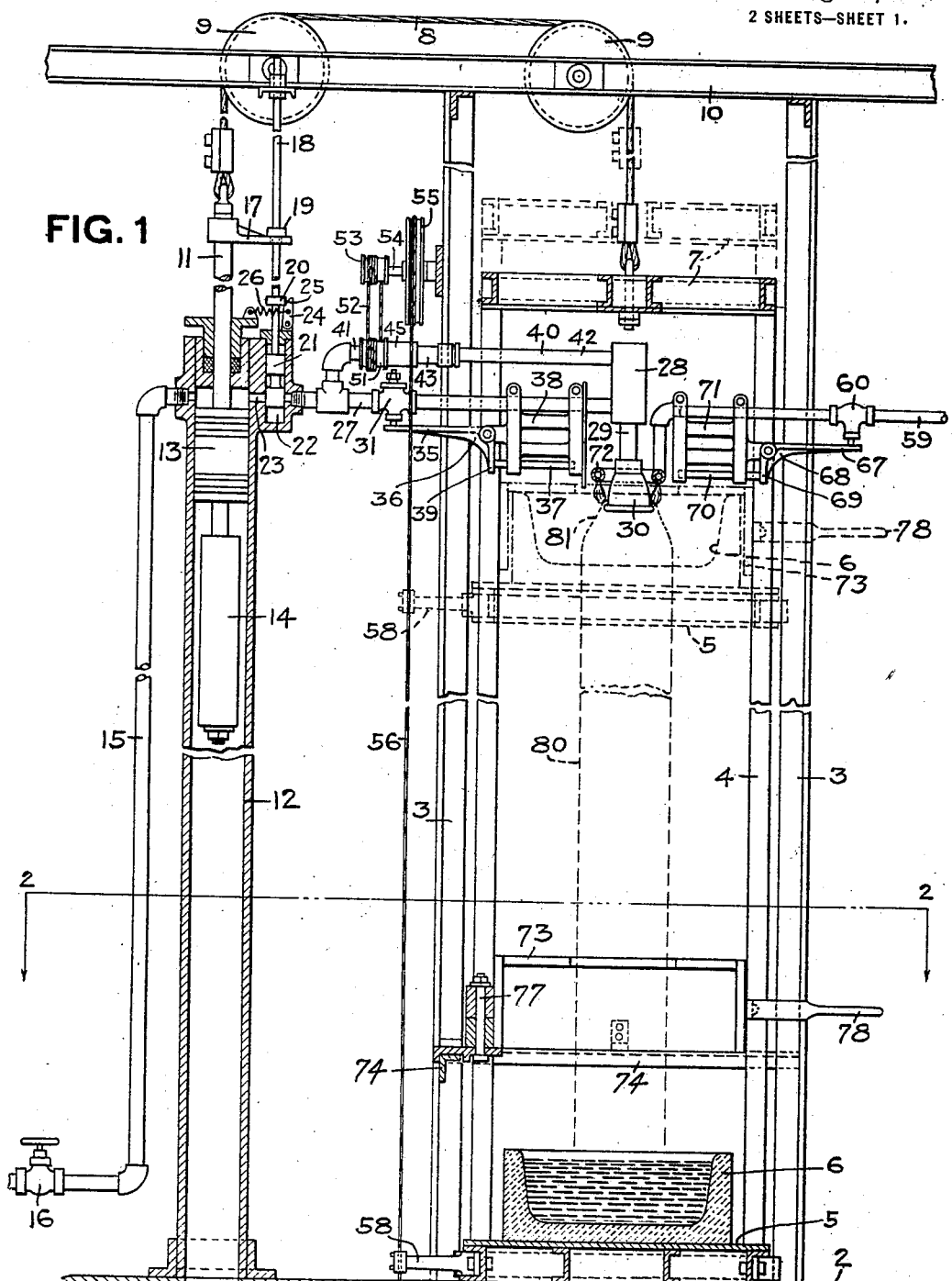
Figure 2:
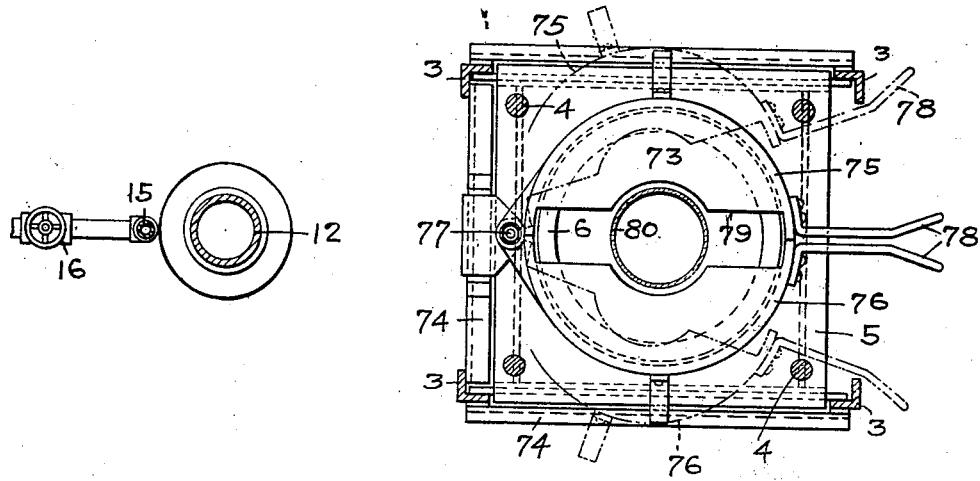
Figure 3:
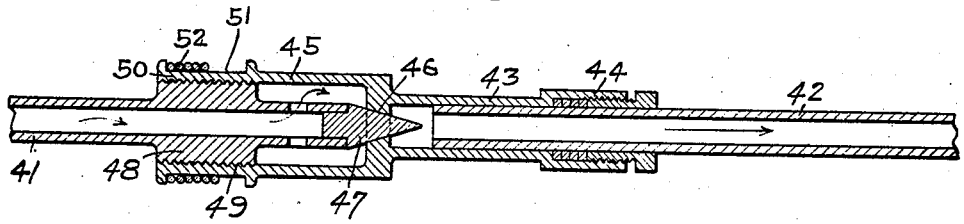
Figure 4:
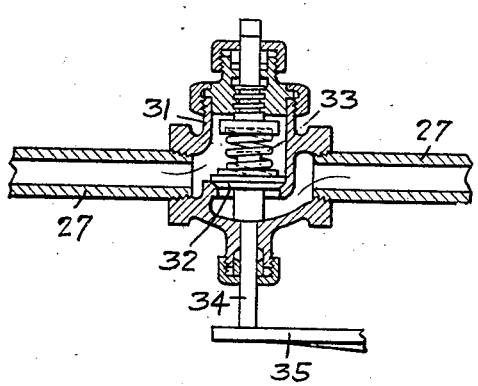
Figure 5:
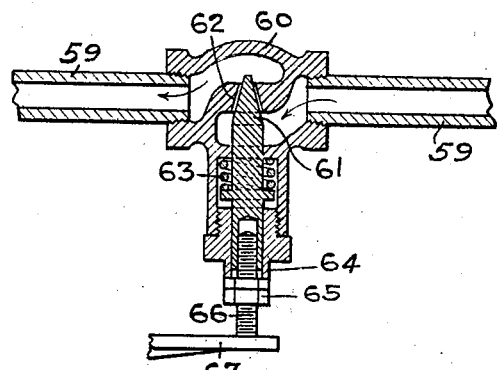

In the accompanying drawing, Figure 1 is a sectional elevation of our improved apparatus; Fig. 2 is a section on the line 2—2, Fig. 1; Figs. 3, 4 and 5 are details of the valves employed.

In the drawings, the numeral 2 designates a suitable base or platform upon which is erected the frame 3, which forms the guide for the elevator-cage 4. The bottom 5 of the elevator-cage forms the support for the pot or receptacle 6, which contains the molten glass. The top 7 of the elevator-cage is connected up with the cable 8, which passes over the sheaves 9 on the overhead frame 10. The opposite end of the cable 8 is connected up to the piston-rod 11 of the air cylinder 12, said piston-rod having the piston 13 adapted to move up and down in said cylinder. Connected to the piston 13 is the weight 14, which acts to counterbalance the cage 4 and the pot 6 carried thereby.

An air-pipe 15 leading from a suitable compressor is connected up to the upper end of the cylinder 12. The valve 16 is provided in the pipe 15 to control the supply of air.

Connected to the piston-rod 11 is the tappet-arm 17, which engages the rod 18 intermediate the collars 19 and 20 on said rod 18. The rod 18 is connected to the piston valve 21 in the valve chamber 22 at the upper end of the cylinder 12, said valve controlling the port 23.

A pivotally mounted finger 24 has the beveled face 25 which is adapted to engage the collar 20, the spring 26 acting to hold said finger in engagement with said collar, said finger acting to hold said collar and the valve 21 when said tappet-arm 17 ascends.

A pipe 27 is connected with the valve chamber 22, said pipe carrying the air to the chamber 28, which is connected by the short pipe section 29 with the suitable bait 30. A valve 31 controls the supply of air passing through the pipe 27, and details of said valve are shown in Fig. 4. The valve proper 32 is normally held to its seat by the spring 33. The stem 34 extends outside the valve casing; and the arm 35 of the bell-crank 36, which is mounted on the frame 38, engages the outer end of the stem 34. This valve is operated by thermostatic action, and to this end, the rod 37 is mounted in the swinging frame 38. The outer end of the rod 37 engages the short arm 39 of the bell-crank 36, and the expansion and contraction of the rod 37 acts through said bell-crank to operate the valve 31 in the manner fully hereinafter set forth.

A branch pipe 40 is connected up with the pipe 27 and communicates with the chamber 28. This branch pipe 40 is made up of two telescoping sections 41 and 42, as shown in Fig. 3. A sliding sleeve 43 connects the sections 41 and 42, said sliding sleeve having the stuffing-box 44 where it engages the section 42. The enlarged portion 45 of the sliding sleeve 43 forms a valve chamber with a seat 46 for the needle valve 47, said needle valve being connected up to the section 41. The section 41 has the enlarged portion 48 with the threads 49, which are engaged by the threaded portion 50 of the enlarged portion 45 of the sleeve 43. It will be apparent that if the sleeve 43 is caused to rotate, the sleeve moving on the section 42 will act to open and close the needle valve, which remains stationary. To provide for this rotation of the sleeve 43, said sleeve has the pulley portion 51, which is engaged by the belt 52, said belt passing up and around the pulley 53 on the stub-shaft 54 mounted in the frame 3. The stub-shaft 54 carries the large sheave 55. A belt 56 passes around said sheave and around the sheave 57 located below the platform 2. Rotation is imparted to the sheave 55 by the movement of the elevator-cage and an arm 58 extending out from the lower end of the elevator-cage engages the belt 56. From the above, it will be apparent that as the elevator-cage ascends, the sheave 55 will be rotated, and through the small pulley 53 a rotary movement will be imparted to the sleeve 43 sufficient to act to close the needle valve; or, on the descent of said elevator-cage, a reverse action takes place and the opening of the needle valve is effected.

A gas pipe 59 is connected up with the suitable gas supply, and a valve 60 is provided in said pipe, which valve is illustrated in detail in Fig. 5. This valve is of the needle type, having the needle 61 which engages the valve seat 62. A spring 63 acts to hold the valve in a given adjusted position, which is controlled by the stop 64. As the needle valve always remains partially open, the amount it is to remain open is controlled by the adjustment of the nut 65 on the threaded stem 66 in the ordinary manner. This valve 60 is also operated by a thermostat and the threaded stem 66 is engaged by the longer arm 67 of the bell-crank 68. The shorter arm 69 of the bell-crank is adapted to engage the thermostat-rod 70 mounted in the frame 71. It will be apparent that as the rod 70 contracts and expands, the supply of gas is regulated accordingly, and the gas valve is throttled as will more fully hereinafter appear.

A circular burner 72 is connected up with the pipe 59, said burner encircling the bait 30, and having openings in the bottom thereof, which direct the gas jets against the lower end of the bait 30 to obtain a proper heat and prevent undue chilling of the gas thereon.

Mounted in the frame 3 is the hood 73, which may be formed of asbestos or any other suitable material, said hood normally resting on the shelf 74 of the frame 3 in the path of movement of the bottom 5 of the elevator-cage. This hood 73, as illustrated in Fig. 2, is formed in two sections 75 and 76, pivoted at 77. These sections are provided with handles 78. When the sections are closed, a space 79 remains, which allows for the extension therethrough of the cylinder 80, which is being blown and for the radiation of heat for the operation of the thermostats.

In the operation of our improved apparatus, the glass from which the cylinder is to be blown is contained in the pot 6, which is supplied from a suitable tank and brought to the apparatus to be placed upon the bottom 5 of the elevator-cage. When the pot 6 has been adjusted in position on the cage, the air is admitted by the pipe 15 to the upper end of the cylinder 12, and as the piston 13 descends, the elevator-cage rises; and as it ascends, the hood 73 is picked up and said hood surrounding the pot 6 acts to protect the glass therein from the atmosphere and retains it at the proper heat. The elevator-cage continues to ascend until the pot has been raised to a point where the bait enters the molten glass and the elevator-cage comes to a standstill. The heat radiated by the molten glass contained in the pot 6 will act to expand the thermostat-rod 37, and as said rod expands, it will act through the bell-crank 36 to open the valve 31. In the meantime, the valve 21 has been opened by th descent of the piston-rod 11 by the tappet-arm 17 engaging the collar 20, and communication from the cylinder 12 to the pipe 27 has been opened. As the valve 31 has been opened in the manner above set forth, the air passes to the chamber 28 and through the connection 29 to the bait. This sudden release of the air from the cylinder 12 will relieve the pressure on the piston 13, and the weight of the elevator-cage and the pot and parts connected therewith, will cause the elevator-cage to descend. Immediately upon the descent of the elevator-cage, the air admitted by the opening of the valve 31 will act to expand the glass connected to the bait, and this sudden inrush of air acts on the large mass of glass at this point to blow out the glass to form the cap portion 81 of the glass cylinder. As the elevator-cage descends, the thermostat-rod 37 gradually contracts, permitting the valve 31 to close automatically; but, at the same time, as said cage descends, the sheave 55 is rotated and through the connections described, the sleeve 43 is rotated and the needle valve 47 opens gradually permitting the air to pass by the branch pipe 40 into the chamber 28, and thence to the bait. This needle valve opens gradually so that as the glass begins to chill, a greater quantity of air is admitted to inflate the glass so that when the pot has descended to its lowest position, the cylinder will be fully blown.

To prevent the glass from congealing on the bait and collecting there so as to prevent the proper operation of the bait, the gas jets from the burner 72 are directed on to the bait, and the supply of gas is controlled by the thermostat 70. When the pot is up in its elevated position, the thermostat expands so as to throttle the valve 60 and reduce the amount of gas. When the pot descends, the action of the thermostat is to throw open the valve 60 and permit the greater quantity of gas to flow to the burner so as to melt the glass and permit the withdrawal of the cylinder, leaving the bait clean for the next drawing operation.

What we claim is:

1. In glass blowing apparatus, the combination of a vertically moving frame, a receptacle for molten glass carried thereby, a bait, a cylinder, a piston in said cylinder, connections between said piston and said vertically movable frame, means for admitting air to said cylinder, and means operated by the movement of said piston to admit the exhaust from said cylinder into said bait.

2. In glass blowing apparatus, the combination of a vertically movable frame, a receptacle for molten glass carried thereby, a bait, a cylinder, a piston in said cylinder, connections between said piston and said movable frame, pipe connections between said cylinder and said bait, means for admitting air to said cylinder, a valve controlling the supply of air to said pipe connections, and means for operating said valve by the movement of said piston.

3. In glass blowing apparatus, the combination of a vertically movable frame, a receptacle for molten glass carried thereby, a bait, a cylinder, a piston in said cylinder, connections between said piston and said movable frame, means for admitting air to said cylinder, pipe connections between said cylinder and said bait, a valve controlling said pipe connections, a piston-rod connected to said valve, a tappet-arm on said piston-rod, and collars on said rod between which said tappet arm moves.

4. In glass blowing apparatus, the combination of a vertically movable frame, a receptacle for molten glass carried thereby, a bait, means for supplying air to said bait, a valve controlling said air supply, a thermostat subject to the heat of said molten glass, and connections between said thermostat and said valve for opening same to admit air to said bait when the molten glass in said receptacle is engaged by said bait.

5. In glass blowing apparatus, the combination of a vertically movable frame, a receptacle for molten glass carried thereby, a bait, means for raising said frame to bring said molten glass in contact with said bait, means for supplying air to said bait, a valve controlling said air supply, a thermostat exposed to the heat from said receptacle when raised, and connections between said thermostat and said valve to open the same.

6. In apparatus for blowing glass, the combination of a vertically movable frame, a receptacle for molten glass carried thereby, a bait, means for raising said frame to bring said glass into contact with said bait, means for supplying air to said bait, a valve controlling said air supply, a thermostat, rods exposed to the heat from said receptacle, a bell-crank, one arm of said bell-crank being engaged with said thermostat, and the other arm of said bell-crank engaging the valve stem.

7. In apparatus for blowing glass, the combination of a vertically movable frame, a receptacle for molten glass carried thereby, a bait, means for raising said frame to bring said bait into contact with said glass, means for supplying air to said bait, a valve controlling said air supply, a thermostat exposed to the heat of said glass when said receptacle is in its elevated position, means for lowering said frame, a supplementary air supply, a valve controlling same, and means for opening said last-named valve by the downward movement of said vertically moving frame.

8. In glass blowing apparatus, the combination of a vertically moving frame, means for raising and lowering same, a receptacle for molten glass carried by said frame, a bait, means for supplying air to said bait, a thermostat exposed to the heat of said molten glass when said receptacle is in its raised position, a valve controlling said air supply, connections between said valve and said thermostat, a supplementary air supply connected to said bait, a rotary valve controlling the last-named air supply, and means for operating said last-named valve by the movement of said vertically moving frame.

9. In glass blowing apparatus, the combination of a vertically movable frame, means for raising and lowering same, a receptacle for molten glass carried by said frame, a bait, means for supplying air to said bait, a gas supply pipe, a burner connected therewith having downwardly directed openings surrounding said bait, a valve controlling said gas-pipe, a thermostat exposed to the heat of said molten glass when said receptacle is in its raised position, and connections between said thermostat and said valve.

10. In apparatus for blowing glass, the combination with a suitable frame, of a vertically movable frame mounted therein, means for raising and lowering said movable frame, a receptacle for holding molten glass carried by said movable frame, a movable hood supported by said first-named frame in the path of said movable frame and lifted thereby, a bait, and means for supplying air to said bait.

11. In apparatus for blowing glass, the combination with a suitable frame, of a vertically movable frame mounted therein, means for raising and lowering said movable frame, a receptacle for carrying molten glass carried by said movable frame, a movable hood supported on said first-named frame in the path of said movable frame, and located at a point above said receptacle when in its lowermost position, a bait, and means for supplying air to said bait.

In testimony whereof, we the said WARREN D. GUMPP, FERNAND M. FRANCART and GEORGE C. DEBAY, have hereunto set our hands.

WARREN D. GUMPP.

Witnesses:
CHAS. W. HANAWALT,
JOHN E. MILSOM.

FERNAND M. FRANCART.
GEORGE C. DEBAY.

Witnesses:
ROBT. D. TOTTEN,
JOHN F. WILL.